(12) United States Patent
Taylor et al.

(10) Patent No.: US 12,031,478 B2
(45) Date of Patent: Jul. 9, 2024

(54) AIR BOTTOMING CYCLE DRIVEN PROPULSOR

(71) Applicant: RAYTHEON TECHNOLOGIES CORPORATION, Farmington, CT (US)

(72) Inventors: Stephen H. Taylor, East Hartford, CT (US); Alan Retersdorf, Avon, CT (US); Oliver V. Atassi, Longmeadow, MA (US)

(73) Assignee: RTX CORPORATION, Farmington, CT (US)

( * ) Notice: Subject to any disclaimer, the term of this patent is extended or adjusted under 35 U.S.C. 154(b) by 139 days.

(21) Appl. No.: 17/951,991

(22) Filed: Sep. 23, 2022

(65) Prior Publication Data

US 2024/0117764 A1    Apr. 11, 2024

Related U.S. Application Data

(63) Continuation-in-part of application No. 17/724,904, filed on Apr. 20, 2022, now Pat. No. 11,702,981.

(51) Int. Cl.
*F02C 6/08* (2006.01)
*F02C 3/10* (2006.01)
(Continued)

(52) U.S. Cl.
CPC ............... *F02C 6/08* (2013.01); *F02C 3/10* (2013.01); *F02C 7/18* (2013.01); *F02C 7/32* (2013.01);
(Continued)

(58) Field of Classification Search
CPC ...... F02C 6/08; F02C 7/08; F02C 7/10; F02C 7/14; F02C 7/18; F02C 7/185; F02C 7/36; F02C 3/10; F02C 3/13; F02C 9/18
See application file for complete search history.

(56) References Cited

U.S. PATENT DOCUMENTS 3,765,170 A * 10/1973 Nakamura .............. F02C 6/003
            60/39.17
11,702,981 B1 * 7/2023 Taylor ...................... F02C 7/18
            60/785

(Continued)

FOREIGN PATENT DOCUMENTS

WO    2010009708 A1    1/2010

OTHER PUBLICATIONS

International Search Report and Written Opinion for International Application No. PCT/US2023/033362 mailed Jan. 2, 2024.

*Primary Examiner* — William H Rodriguez
(74) *Attorney, Agent, or Firm* — Carlson, Gaskey & Olds, P.C.

(57) ABSTRACT

An aircraft propulsion system includes a core engine that includes a core flow path where a core airflow is compressed in a compressor section, communicated to a combustor section, mixed with fuel and ignited to generate a gas flow that is expanded through a turbine section for powering a primary propulsor. The aircraft propulsion system further includes a tap that is at a location upstream of the combustor section where a bleed airflow is drawn, a heat exchanger where the bleed airflow is heated by the gas flow, a power turbine through which heated bleed airflow is expanded to generate a work output, and a secondary propulsor that is driven by the work output that is generated by the power turbine.

20 Claims, 5 Drawing Sheets

(51) Int. Cl.
  *F02C 7/18* (2006.01)
  *F02C 7/32* (2006.01)
  F02C 7/36 (2006.01)
  F02C 9/18 (2006.01)

(52) U.S. Cl.
  CPC  *F02C 7/36* (2013.01); *F02C 9/18* (2013.01); *F05D 2220/323* (2013.01); *F05D 2220/36* (2013.01)

(56) References Cited

U.S. PATENT DOCUMENTS

| | | | |
|---|---|---|---|
| 11,773,778 B1 * | 10/2023 | Retersdorf | F02C 7/32 60/785 |
| 2013/0327014 A1 | 12/2013 | Moulebhar | |
| 2014/0352317 A1 | 12/2014 | Loebig et al. | |
| 2016/0090917 A1 | 3/2016 | Bruno et al. | |
| 2017/0167378 A1 * | 6/2017 | Klosinski | F01K 23/10 |
| 2017/0167379 A1 * | 6/2017 | Scipio | F02C 6/08 |
| 2020/0158019 A1 * | 5/2020 | Kawai | F02C 7/224 |
| 2020/0200085 A1 | 6/2020 | Perlak et al. | |
| 2021/0301729 A1 | 9/2021 | Staubach et al. | |
| 2024/0084731 A1 * | 3/2024 | Retersdorf | F02C 6/08 |

* cited by examiner

AIR BOTTOMING CYCLE DRIVEN PROPULSOR

CROSS REFERENCE TO RELATED APPLICATION

This application is a continuation-in-part of U.S. application Ser. No. 17/724,904 filed on Apr. 20, 2022.

TECHNICAL FIELD

The present disclosure relates generally to a turbine engine including a waste heat recovery system for capturing thermal energy to drive a propulsor.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

An aircraft propulsion system according to an exemplary embodiment of this disclosure, among other possible things includes a core engine that includes a core flow path where a core airflow is compressed in a compressor section, communicated to a combustor section, mixed with fuel and ignited to generate a gas flow that is expanded through a turbine section for powering a primary propulsor. The aircraft propulsion system further includes a tap that is at a location upstream of the combustor section where a bleed airflow is drawn, a heat exchanger where the bleed airflow is heated by the gas flow, a power turbine through which heated bleed airflow is expanded to generate a work output, and a secondary propulsor that is driven by the work output that is generated by the power turbine.

In a further embodiment of the foregoing, the compressor section includes a first compressor and a second compressor and the tap is located after the first compressor and before the second compressor.

In a further embodiment of any of the foregoing, the compressor section includes a first compressor and a second compressor and the tap is located after the second compressor.

In a further embodiment of any of the foregoing, the heat exchanger is disposed downstream of the turbine section.

In a further embodiment of any of the foregoing, the aircraft propulsion system includes a generator that is electrically coupled to drive an electric motor. The electric motor is coupled to drive the secondary propulsor and the generator is coupled to the power turbine. Rotation of the power turbine drives the generator to produce electric power for the electric motor.

In a further embodiment of any of the foregoing, the secondary propulsor is located separate from the core engine and the primary propulsor.

In a further embodiment of any of the foregoing, the primary propulsor includes a fan section with a plurality of fan blades that are rotatable about an engine longitudinal axis.

In a further embodiment of any of the foregoing, the secondary propulsor includes a fan with a plurality of fan blades that are rotatable about a secondary longitudinal axis.

In a further embodiment of any of the foregoing, the power turbine is disposed about the secondary longitudinal axis.

In a further embodiment of any of the foregoing, the aircraft propulsion system includes a thermal transfer system where a thermal transfer medium transfers heat energy from the gas flow into the bleed airflow.

In a further embodiment of any of the foregoing, the thermal transfer system includes a closed fluid circuit and includes a pump for circulating the thermal transfer medium through the closed fluid circuit and a thermal transfer heat exchanger where heat from the gas flow is input into the thermal transfer medium.

In a further embodiment of any of the foregoing, the secondary propulsor includes a fan with a plurality of fan blades that are disposed at the aft end of an aircraft fuselage.

An aircraft assembly according to another exemplary embodiment of this disclosure, among other possible things includes an airframe structure that includes a fuselage and wings, and a propulsion system that is mounted to the airframe structure. The propulsion system includes a core engine that includes a core flow path where a core airflow is compressed in a compressor section, communicated to a combustor section, mixed with fuel and ignited to generate a gas flow that is expanded through a turbine section. The aircraft assembly further includes a tap at a location upstream of the combustor section where a bleed airflow is drawn, and a heat exchanger where the bleed airflow is heated by the gas flow. The aircraft assembly further includes a power turbine through which heated bleed airflow is expanded to generate a work output, and a primary propulsor driven by the turbine section of the core engine. The primary propulsor includes a fan section with a plurality of fan blades that are rotatable about an engine longitudinal axis, and a secondary propulsor that is driven by the work output that is generated by the power turbine and is located separate from the core engine and the primary propulsor.

In a further embodiment of the foregoing, the aircraft assembly includes a generator that is electrically coupled to drive an electric motor. The electric motor is coupled to drive the secondary propulsor, and the generator is coupled to the power turbine. Rotation of the power turbine drives the generator to produce electric power for the electric motor.

In a further embodiment of any of the foregoing, the secondary propulsor includes a fan with a plurality of fan blades that are rotatable about a secondary longitudinal axis.

In a further embodiment of any of the foregoing, the power turbine is disposed about the secondary longitudinal axis.

In a further embodiment of any of the foregoing, the aircraft propulsion system includes a thermal transfer system where a thermal transfer medium transfers heat energy that is obtained within the heat exchanger from the gas flow into the bleed airflow in a thermal transfer heat exchanger. The thermal transfer system includes a closed fluid circuit and includes a pump for circulating the thermal transfer medium through the closed fluid circuit and the thermal transfer heat exchanger where heat energy is transferred to the bleed airflow.

In a further embodiment of any of the foregoing, the secondary propulsor includes a fan with a plurality of fan blades that are located on the airframe structure aft of the core engine and primary propulsor.

A method of powering an aircraft according to another exemplary embodiment of this disclosure, among other possible things includes generating a gas flow by igniting a fuel mixed with a core airflow, expanding the gas flow through a turbine section that is coupled to a primary propulsor, communicating a portion of the core airflow as a bleed airflow through a tap, heating the bleed airflow with the gas flow within a heat exchanger, generating shaft power by expanding at least a portion of heated bleed airflow that is exhausted through a power turbine, driving the primary propulsor about an engine longitudinal axis with the turbine section, and driving a secondary propulsor about a secondary axis that is spaced apart from the engine longitudinal axis with energy that is generated through rotation of the power turbine.

In a further embodiment of the foregoing, the power turbine drives a generator that is electrically coupled to drive an electric motor. The electric motor is coupled to drive the secondary propulsor and the generator is coupled to the power turbine. Rotation of the power turbine drives the generator to produce electric power for the electric motor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
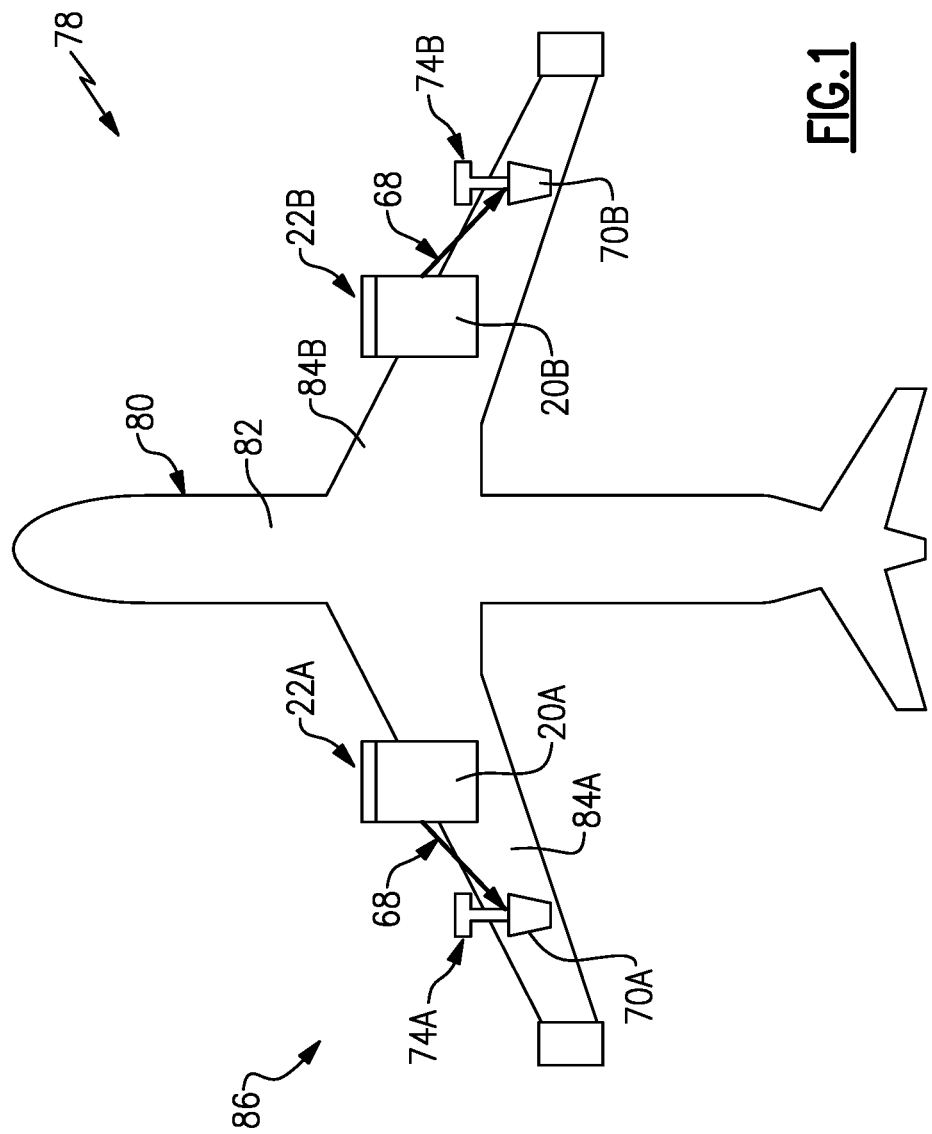
FIG. 1 is a schematic view of an example aircraft and a propulsion system embodiment.

FIG. 1 schematically illustrates an example aircraft 78 with a propulsion system 86 that include core turbine engine assemblies 20A, 20B that each drive a secondary propulsor 74A, 74B. The secondary propulsors 74A, 74B are fans that are driven by corresponding power turbines 70A, 70B. A bleed airflow 68 from the core turbine engine assemblies 20A, 20B are heated and expanded through the corresponding power turbine 70A, 70B to power the secondary propulsors. Exhaust heat from the core turbine engine assembles 74A, 74B is recovered in the form of the heated bleed airflow and utilized to improve both overall propulsive and thermal efficiency through the powering of the secondary propulsors 74A, 74B.

Figure 2:
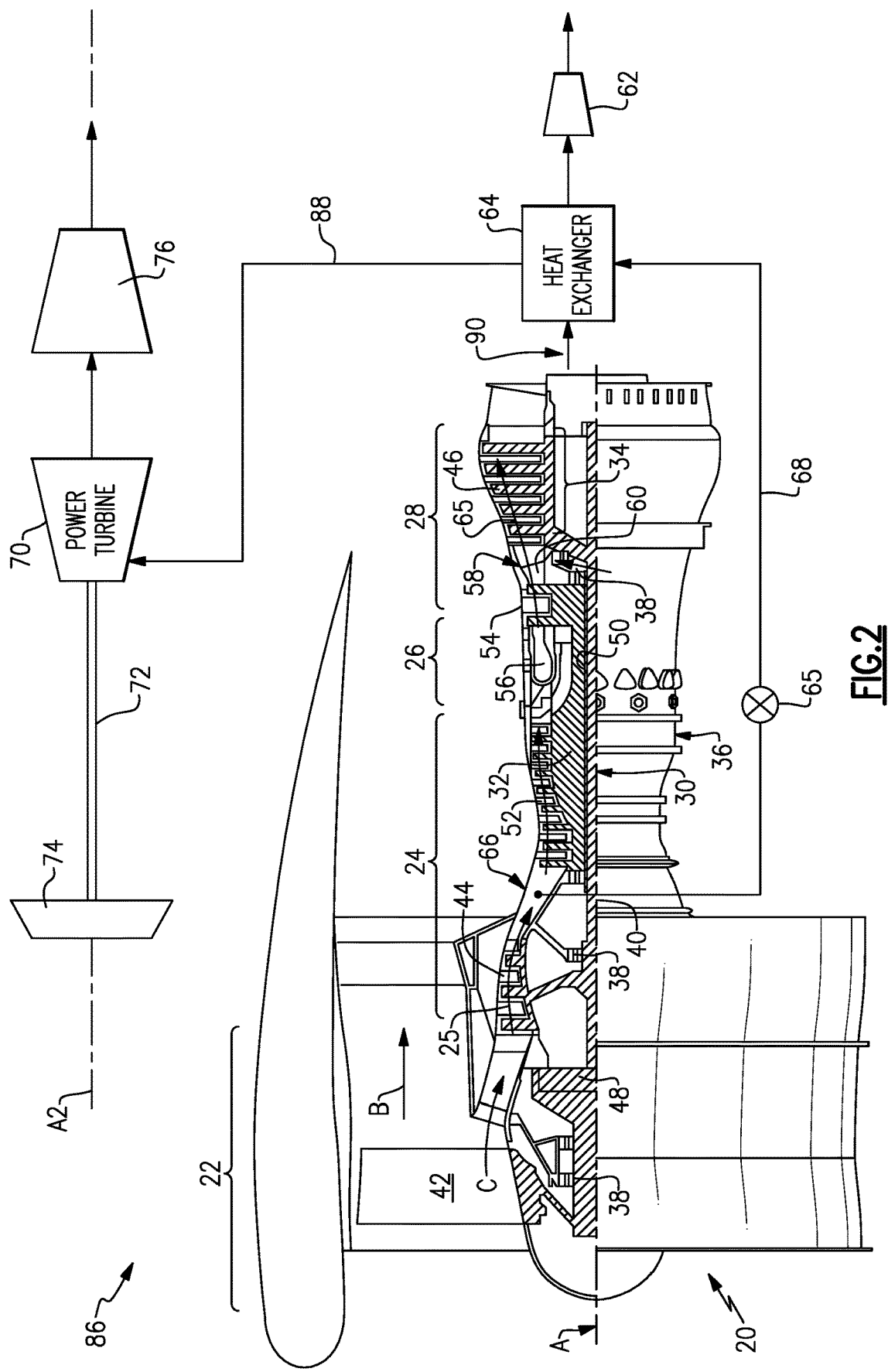
FIG. 2 is a schematic view of an example propulsion system embodiment.

Referring to FIGS. 1 and 2, one example core turbine engine 20 is schematically shown and includes the primary propulsor embodied as a fan section 22, a compressor section 24, a combustor section 26 and a turbine section 28. The fan section 22 drives inlet air along a bypass flow path B, while the compressor section 24 draws air in along a core flow path C where a core airflow 25 is compressed and communicated to a combustor section 26. In the combustor section 26, air is mixed with fuel and ignited to generate a high energy hot exhaust gas stream that expands through the turbine section 28 where energy is extracted and utilized to drive the fan section 22 and the compressor section 24.

Although the disclosed non-limiting embodiment depicts a two-spool turbofan turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

The core airflow 25 through the core airflow path C is compressed by the low-pressure compressor 44 then by the high-pressure compressor 52 mixed with fuel and ignited in the combustor 56 to produce high energy hot exhaust gases that are expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the turbine engine 20 is increased and a higher power density may be achieved.

The disclosed turbine engine 20 in one example is a high-bypass geared aircraft engine. In a further example, the turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbine engine 20 includes a bypass ratio greater than about ten (10:1) and the fan diameter is significantly larger than an outer diameter of the low-pressure compressor 44. It should be understood, however, that the above parameters are only exemplary of one embodiment of a turbine engine including a geared architecture and that the present disclosure is applicable to other turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of [(Tram °R)/(518.7°R)]0.5. The "Low corrected fan tip speed", as disclosed herein according to one non-limiting embodiment, is less than about 1150 ft/second.

The example turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example turbine engine 20 with increased power transfer efficiency.

Thermal energy produced through the combustion process is wasted as the high energy exhaust gas flow is vented to atmosphere after expansion through the turbine section 28. This thermal energy vented to atmosphere can be used to drive other systems to produce power.

The example propulsion system 86 uses thermal energy from the exhaust gas flow 90 to heat a bleed airflow 68 drawn from a tap 66. The bleed airflow 68 is directed to a heat exchanger 64, where heat from the exhaust gas flow 90 is transferred into the bleed airflow 68 and communicated as a heated bleed airflow 88 to drive a power turbine 70. The power turbine 70 generates a work output to drive the secondary propulsor 74. A bleed airflow valve 65 may be provided downstream of the tap 66 to control the quantity of bleed airflow provided to the power turbine 70. The amount of bleed airflow may be tailored by operation of the valve 65 to correspond to engine operation and propulsion demands.

The secondary propulsor 74 is disposed about second longitudinal axis A2 that is separate from the engine longitudinal axis A. Though depicted as parallel axes, this is not intended to be so limiting, and axis A2 may be configured at an angle (e.g., vertical and/or horizontal) with respect to axis A. In this disclosed embodiment, the power turbine 70 drives a shaft 72 that is also disposed about the second longitudinal axis A2. Expanded bleed airflow is exhausted though a second nozzle 76 that is separate from the core engine nozzle 62.

The secondary propulsor 74 is a fan that provides additional propulsive thrust for the aircraft 78. The additional thrust provided by the propulsor 74 may provide for an effective increase in bypass airflow, resulting in a net improvement in propulsive efficiency. Such an increase in bypass airflow is often not possible by simply increasing the diameter of propulsor 42 due to other factors limiting propulsor size. Moreover, the secondary propulsor 74 may be located at locations on the airframe 82 that are not suitable for supporting a core turbine engine.

In this disclosed example embodiment, the tap 66 is disposed between the LPC 44 and the HPC 52. However, it should be appreciated, that tap 66 may be located in other locations that provide the bleed airflow at a pressure sufficient to drive the power turbine 70. For example, other locations within LPC 44 and/or the HPC 52 of the compressor section 24 could be utilized and are within the scope and contemplation of this disclosure. The bleed airflow 68 from the tap 66 is of an increased temperature and pressure due to work performed in the LPC 44.

The example heat exchanger 64 is arranged after the last turbine section, that is the low pressure turbine 46 in this example. The heat exchanger 64 may be arranged at different locations within the turbine section 28 and remain within the scope and contemplation of this disclosure. The heated bleed air indicated at 88 from the heat exchanger 64 is directed to the power turbine 70. Expansion of the heated bleed airflow 88 drives the power turbine 72 and is exhausted through the nozzle 76 to atmosphere. Bleed air passing through the secondary nozzle 76 may add an additional amount of thrust.

Figure 3:
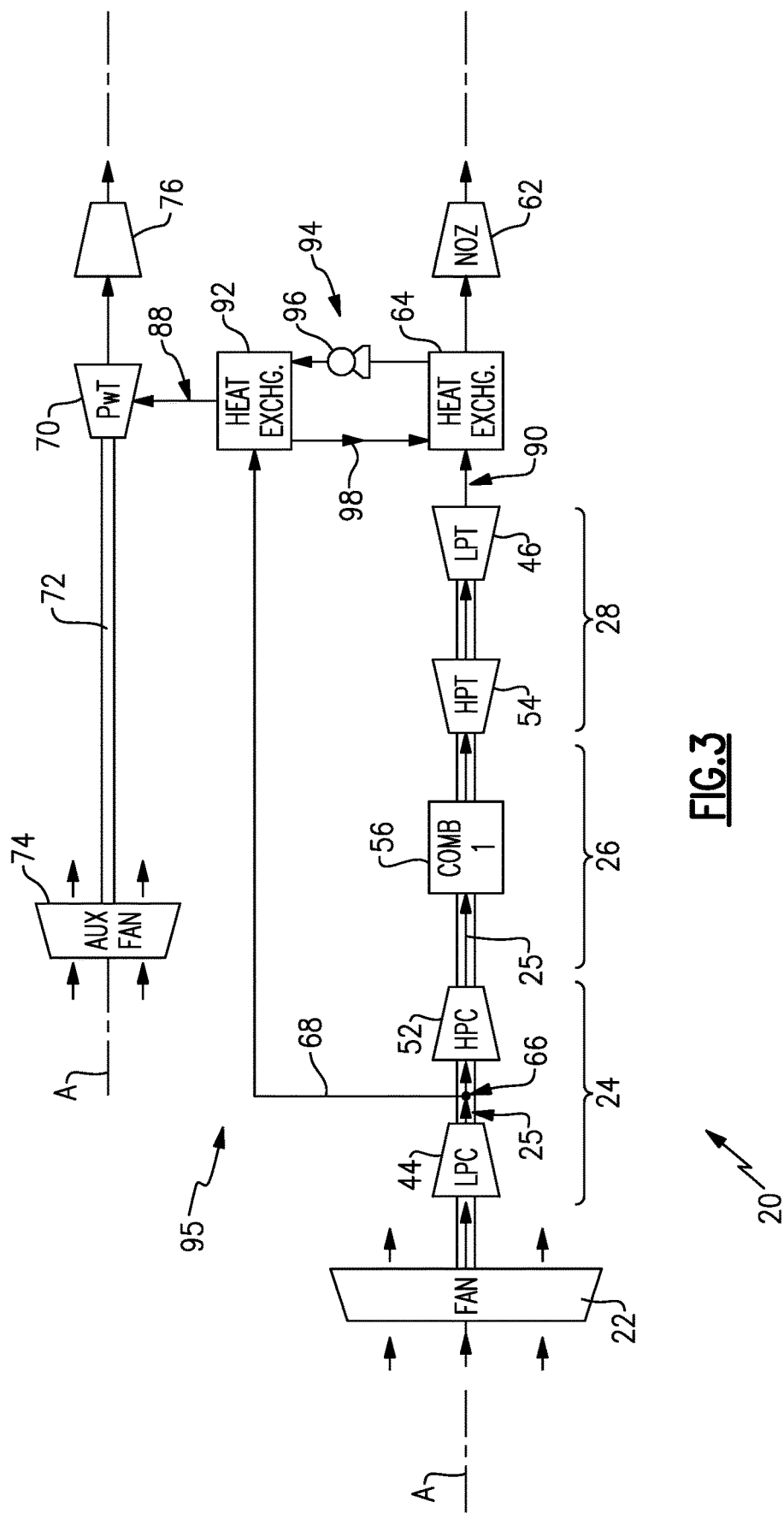
FIG. 3 is a schematic view of another example propulsion system embodiment.

Referring to FIG. 3 another example propulsion system is schematically shown and indicated at 95. The propulsion system 95 includes the same core engine assembly 20 as previously described with the addition of a thermal transfer system 94. The thermal transfer system 94 is a closed loop liquid circuit where a thermal transfer medium 98 transfers thermal energy between the gas flow 90 and the bleed airflow 68. The thermal transfer medium 98 is a medium that remains stable at temperatures encountered in the turbine section 90. A pump 96 is provided to circulate the thermal transfer medium 98 within the closed thermal transfer system 94 between the exhaust heat exchanger 64 and a transfer heat exchanger 92.

The bleed airflow 68 from the tap 66 is placed in thermal communication with the heated thermal transfer medium 98 such that the bleed airflow is heated to a desired temperature. The heated bleed airflow 88 is then communicated and expanded through the power turbine 70. The thermal transfer system 94 enables a small exhaust heat exchanger 64 and opportunities to significantly simplify the ducting for the bleed airflow.

Figure 4:
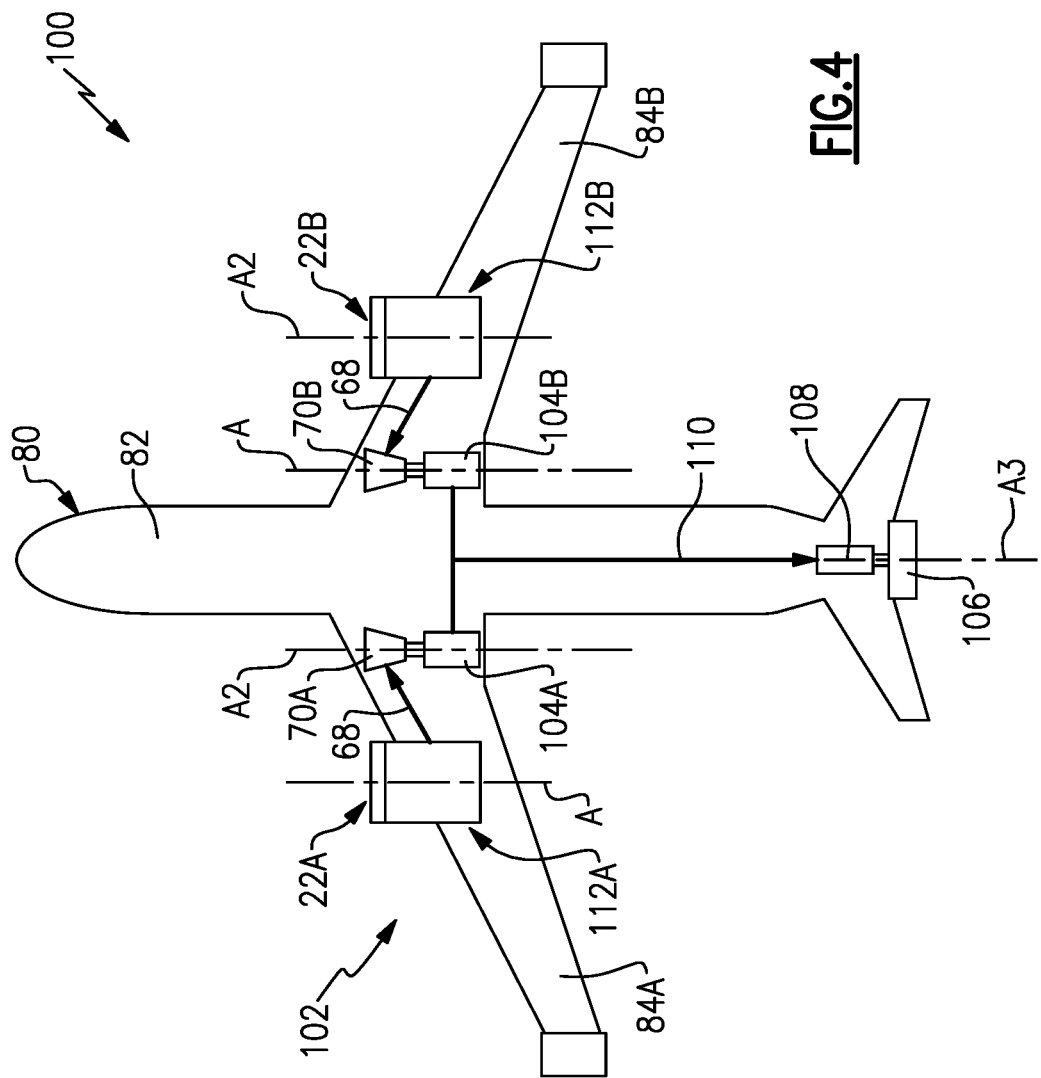
FIG. 4 is a schematic view of another aircraft and propulsion system embodiment.
Figure 5:
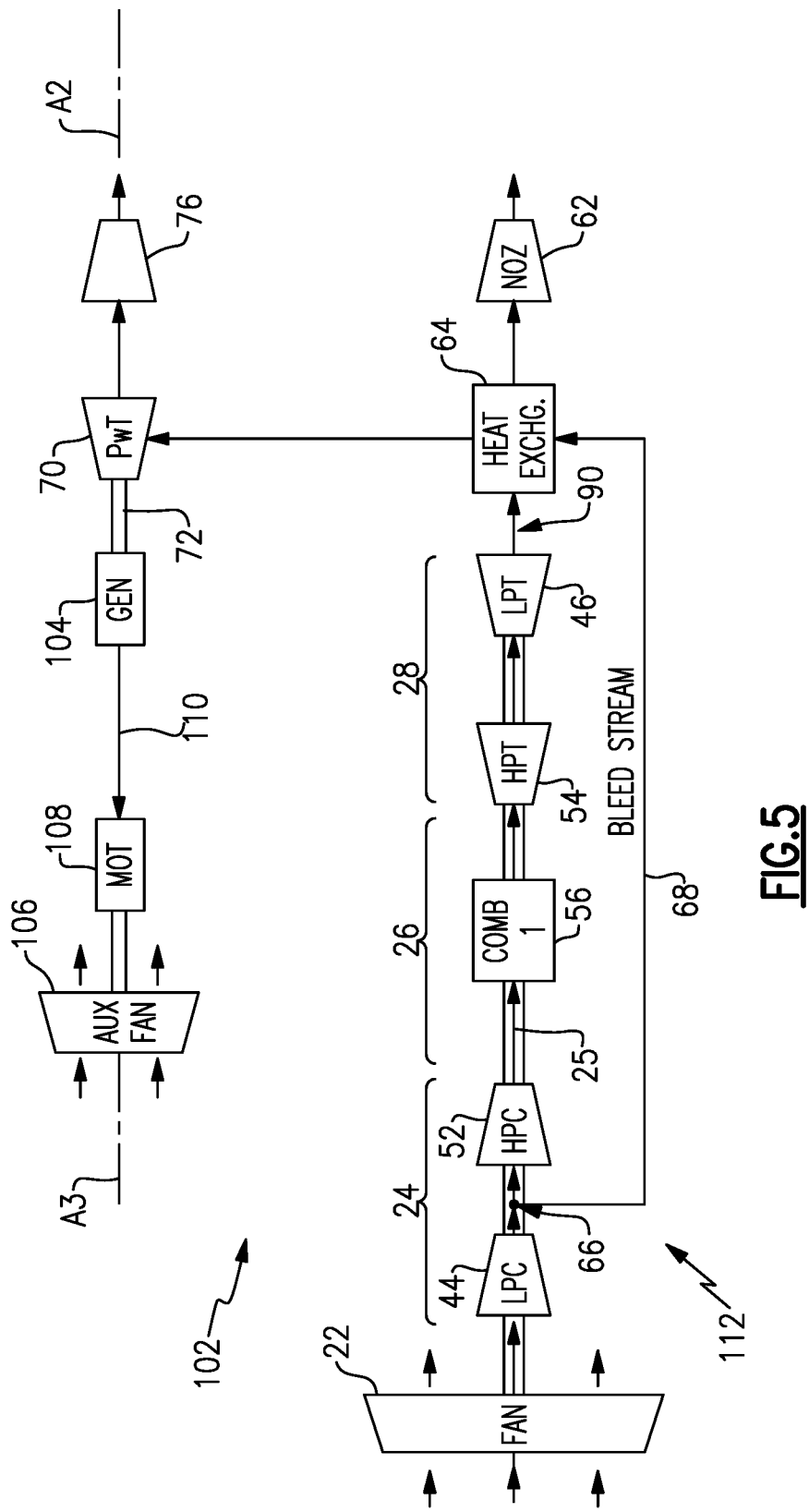
FIG. 5 is a schematic view of another propulsion system embodiment.

Referring to FIGS. 4 and 5, another example aircraft embodiment is schematically shown and indicated at 100 and includes an example propulsion system embodiment 102. The example propulsion system 102 includes core engine assemblies 112A, 112B. Each of the core engine assemblies 112A, 112B drive a corresponding primary propulsor embodied as fans 22A, 22B. A bleed airflow 68 from each of the core engine assemblies 112A, 112B, drive corresponding power turbines 70A, 70B. Each power turbine 70A, 70B drives a corresponding generator 104A, 104B. The generators 104A, 104B are electrically coupled to an electric motor 108. The electric motor 108 drives a secondary propulsor 106 located in aft portion of the aircraft fuselage 82.

The secondary propulsor 106 is arranged about an aft axis A3 that is separate from the engine longitudinal axis A and the secondary longitudinal axis A2. The power turbines 70A, 70B are each disposed along respective secondary longitudinal axes A2. Although schematically shown as a single secondary longitudinal axis A2, several secondary propulsors 106 may be provide with each disposed about a corresponding secondary axes A2. In this disclosed example, the power turbines 70A, 70B and the generators 104A, 104B are disposed in the aircraft wings 84A, 84A (FIG. 1) in close proximity to the corresponding core engine assemblies 112A, 112B. In another example embodiment, the generators 104A, 104B may be disposed in the fuselage 82 separate from both the core engine assemblies 112A, 112B and the secondary propulsor 106.

Electric power 110 generated by the generators 104A, 104B is combined in this example embodiment and communicated to the motor 108. The generators 104A, 104B may provide electric power to other aircraft and/or engine devices in addition to the motor 108. Moreover, the generators 104A, 104B may provide power individually to motor 108.

In the example embodiment, a single secondary propulsor 106 is shown, however, additional propulsors may be utilized within the scope and contemplation of this disclosure. The power turbines 70A, 70B and generators 104A, 104B may be arranged such that each drives a separate propulsor 106 mounted at other locations of the aircraft 100, such as for example in each of the wings 84A, 84B outboard of the core engine assemblies 112A, 112B similar to the configuration illustrated in FIG. 1.

The use of the electric motor 108 to drive the secondary propulsor 106 provides additional practical mounting options on the airframe 80 for additional propulsors without the need for complex ducting for heated and pressurized bleed airflows.

Accordingly, the disclosed propulsion systems recover thermal energy from the core engine assemblies in the form of a heated bleed airflow to drive secondary propulsors. The additional propulsors provide for leveraging of energy recovery to improve engine and propulsive efficiencies without additional demands on the core engine assembly.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
 a core engine including a core flow path where a core airflow is compressed in a compressor section, communicated to a combustor section, mixed with fuel and ignited to generate a gas flow that is expanded through a turbine section for powering a primary propulsor;
 a tap at a location upstream of the combustor section where a bleed airflow is drawn;
 a heat exchanger where the bleed airflow is heated by the gas flow;
 a power turbine through which heated bleed airflow is expanded to generate a work output; and
 a secondary propulsor driven by the work output generated by the power turbine.

2. The aircraft propulsion system as recited in claim 1, wherein the compressor section includes a first compressor and a second compressor and the tap is located after the first compressor and before the second compressor.

3. The aircraft propulsion system as recited in claim 1, wherein the compressor section includes a first compressor and a second compressor and the tap is located after the second compressor.

4. The aircraft propulsion system as recited in claim 1, wherein the heat exchanger is disposed downstream of the turbine section.

5. The aircraft propulsion system as recited in claim 1, including a generator electrically coupled to drive an electric motor, the electric motor coupled to drive the secondary propulsor and the generator coupled to the power turbine, wherein rotation of the power turbine drives the generator to produce electric power for the electric motor.

6. The aircraft propulsion system as recited in claim 1, wherein the secondary propulsor is located separate from the core engine and the primary propulsor.

7. The aircraft propulsion system as recited in claim 1, wherein the primary propulsor comprises a fan section with a plurality of fan blades rotatable about an engine longitudinal axis.

8. The aircraft propulsion system as recited in claim 1, wherein the secondary propulsor comprises a fan with a plurality of fan blades rotatable about a secondary longitudinal axis.

9. The aircraft propulsion system as recited in claim 8, wherein the power turbine is disposed about the secondary longitudinal axis.

10. The aircraft propulsion system as recited in claim 1, including a thermal transfer system where a thermal transfer medium transfers heat energy from the gas flow into the bleed airflow.

11. The aircraft propulsion system as recited in claim 10, wherein the thermal transfer system comprises a closed fluid circuit and includes a pump for circulating the thermal transfer medium through the closed fluid circuit and a thermal transfer heat exchanger where heat from the gas flow is input into the thermal transfer medium.

12. The aircraft propulsion system as recited in claim 1, wherein the secondary propulsor comprises a fan with a plurality of fan blades disposed at the aft end of an aircraft fuselage.

13. An aircraft assembly comprising:

an airframe structure including a fuselage and wings;

a propulsion system mounted to the airframe structure, the propulsion system including a core engine including a core flow path where a core airflow is compressed in a compressor section, communicated to a combustor section, mixed with fuel and ignited to generate a gas flow that is expanded through a turbine section, a tap at a location upstream of the combustor section where a bleed airflow is drawn, a heat exchanger where the bleed airflow is heated by the gas flow;

a power turbine through which heated bleed airflow is expanded to generate a work output;

a primary propulsor driven by the turbine section of the core engine, the primary propulsor comprises a fan section with a plurality of fan blades rotatable about an engine longitudinal axis; and a secondary propulsor driven by the work output generated by the power turbine and is located separate from the core engine and the primary propulsor.

14. The aircraft assembly as recited in claim 13, including a generator electrically coupled to drive an electric motor, the electric motor coupled to drive the secondary propulsor, and the generator coupled to the power turbine, wherein rotation of the power turbine drives the generator to produce electric power for the electric motor.

15. The aircraft assembly as recited in claim 13, wherein the secondary propulsor comprises a fan with a plurality of fan blades rotatable about a secondary longitudinal axis.

16. The aircraft assembly as recited in claim 15, wherein the power turbine is disposed about the secondary longitudinal axis.

17. The aircraft assembly as recited in claim 13, including a thermal transfer system where a thermal transfer medium transfers heat energy obtained within the heat exchanger from the gas flow into the bleed airflow in a thermal transfer heat exchanger, wherein the thermal transfer system comprises a closed fluid circuit and includes a pump for circulating the thermal transfer medium through the closed fluid circuit and the thermal transfer heat exchanger where heat energy is transferred to the bleed airflow.

18. The aircraft propulsion system as recited in claim 13, wherein the secondary propulsor comprises a fan with a plurality of fan blades located on the airframe structure aft of the core engine and primary propulsor.

19. A method of powering an aircraft comprising:

generating a gas flow by igniting a fuel mixed with a core airflow;

expanding the gas flow through a turbine section coupled to a primary propulsor;

communicating a portion of the core airflow as a bleed airflow through a tap;

heating the bleed airflow with the gas flow within a heat exchanger;

generating shaft power by expanding at least a portion of heated bleed airflow exhausted through a power turbine;

driving the primary propulsor about an engine longitudinal axis with the turbine section; and driving a secondary propulsor about a secondary axis spaced apart from the engine longitudinal axis with energy generated through rotation of the power turbine.

20. The method as recited in claim 19, wherein the power turbine drives a generator electrically coupled to drive an electric motor, the electric motor coupled to drive the secondary propulsor and the generator is coupled to the power turbine, wherein rotation of the power turbine drives the generator to produce electric power for the electric motor.

* * * * *